United States Patent
Wölfel

(10) Patent No.: US 6,756,752 B2
(45) Date of Patent: Jun. 29, 2004

(54) CIRCUIT ARRANGEMENT FOR CONTROLLING A LOAD

(75) Inventor: Werner Wölfel, Stuttgart (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/274,116

(22) Filed: Oct. 21, 2002

(65) Prior Publication Data

US 2003/0075989 A1 Apr. 24, 2003

(30) Foreign Application Priority Data

Oct. 22, 2001 (EP) .............................................. 01440356

(51) Int. Cl.⁷ ................................................ H02P 7/00
(52) U.S. Cl. ...................... 318/139; 318/138; 318/254; 318/439; 318/432; 323/265; 323/268; 323/270; 323/271; 323/272
(58) Field of Search ................................ 318/139, 138, 318/254, 439, 432; 323/265, 268, 270, 271, 272

(56) References Cited

U.S. PATENT DOCUMENTS

| | | | |
|---|---|---|---|
| 3,748,559 A | * | 7/1973 | Steinmann ................... 388/831 |
| 4,374,347 A | * | 2/1983 | Muller ........................ 318/138 |
| 4,471,276 A | | 9/1984 | Cudlitz |
| 4,477,752 A | | 10/1984 | Nakano et al. |
| 5,012,381 A | * | 4/1991 | Elliott et al. ................... 361/84 |
| 5,036,269 A | * | 7/1991 | Murari et al. ................ 323/266 |
| 5,502,369 A | * | 3/1996 | Niwayama ................... 323/273 |
| 5,811,948 A | | 9/1998 | Sato et al. |
| 6,268,772 B1 | * | 7/2001 | Chen .......................... 330/288 |

FOREIGN PATENT DOCUMENTS

EP         0486879 A2    5/1992

OTHER PUBLICATIONS

K. Sakamoto et al, A Three–Terminal Intelligent Power Mosfet with Built–In Reverse battery protection for Automotive Applications, IEEE Transaction on Electron Devices, IEEE Inc. NY, US, Nov. 1999, XP000873601.

* cited by examiner

*Primary Examiner*—Rina Duda
(74) *Attorney, Agent, or Firm*—Sughrue Mion, PLLC

(57) ABSTRACT

A circuit for controlling the electric power to be supplied from a direct-current source to a load, particularly to a fan or heater in a motor vehicle. The circuit has a first field-effect transistor, to be connected in series with the load to be controlled, and a control circuit for controlling the field-effect transistor. The first field effect transistor has a second field-effect transistor connected in series therewith, and a resistor is connected in parallel with one of the field-effect transistors. The control circuit is adapted to control the two field-effect transistors in the sense of a fadeover between two final states in each of which one of the field-effect transistors is off and the other is on.

3 Claims, 2 Drawing Sheets

CIRCUIT ARRANGEMENT FOR CONTROLLING A LOAD

BACKGROUND OF THE INVENTION

The invention is based on a priority application EP 01440356.2 which is hereby incorporated by reference.

This invention relates to a circuit arrangement for controlling the electric power to be supplied from a direct-current source to a load, particularly to a fan or heater in a motor vehicle.

To control the electric power to be supplied from a direct-current source to a load, use is frequently made of power field-effect transistors which are simply connected in series with the load to be controlled. Their use is relatively unproblematic; in particular, they are simple to control.

A frequent field of application is that of fans or heaters in motor vehicles. These operate on a voltage of 12 volts from the on-board battery. Because of the low voltage, relatively high currents occur. For instance, a load with a power of 360 W requires a current of 30 A. During the control of this power, a maximum power dissipation of 90 W occurs in the controlling power field-effect transistor. Suitable field-effect transistors are at least very expensive. Because of the high temperatures caused by the high power dissipation, their life expectancy is generally short.

In principle, field-effect transistors can also be used to turn loads on and off under clock-pulse control and thus achieve power control. In that case, relatively little power is dissipated. Particularly because of the existing tendency towards radio interference, which is complicated and costly to get control of, this solution is frequently not desired. By connecting field-effect transistors in parallel, it is possible to use less expensive transistors, but the thermal problems are reduced only slightly. In addition, the currents do not readily divide in equal shares.

SUMMARY OF THE INVENTION

The object of the invention is to provide a circuit arrangement of the above kind which permits a low-cost solution to the problem.

According to the invention, this object is attained by a circuit arrangement for controlling the electric power to be supplied from a direct-current source to a load, particularly to a fan or heater in a motor vehicle, the circuit arrangement comprising a field-effect transistor to be connected in series with the load to be controlled and a control circuit for controlling the field-effect transistor, the field-effect transistor having a second field-effect transistor connected in series therewith, a resistor being connected in parallel with one of the field-effect transistors, and the control circuit being adapted to control the two field-effect transistors in the sense of a fadeover between two final states in each of which one of the field-effect transistors is off and the other is on.

The invention is based on the idea to largely shift the inevitable power dissipation in a low-cost analog solution to a low-cost resistor. In this manner and with a suitable circuit design, even at the most unfavorable operating point, the two field-effect transistors used in accordance with the invention together have to dissipate only half as much power as if only one such transistor is used. Further developments of the invention are apparent from the subclaims and the following description.

SHORT DESCRIPTION OF THE DRAWINGS

The invention will now be explained in more detail with reference to the accompanying drawings, in which.

DETAILED DESCRIPTION OF THE INVENTION

Figure 1:
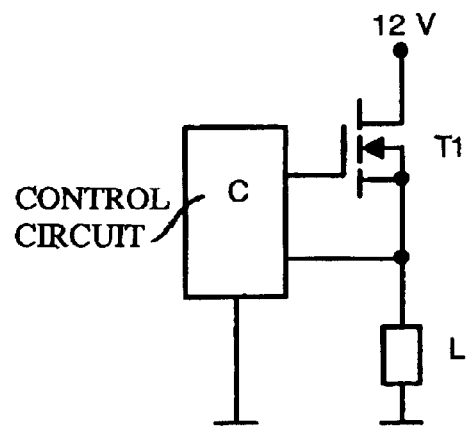
FIG. 1 shows a load and a prior-art circuit arrangement.

Referring to FIG. 1, an arrangement consisting of a load and a prior-art circuit arrangement will be described. The load to be controlled and the circuit arrangement controlling it are assumed to be two separate modules and particularly two separate economic units. The prior-art circuit arrangement consists of a field-effect transistor T1, acting as a control transistor, and a control circuit C. Field-effect transistor T1 has its source connected in series with a load L to be controlled, such that the two devices are connected to the operating voltage, here between the terminals "12 V" and ground of the on-board power supply of a motor vehicle. Control circuit C applies between the gate and source of the field-effect transistor T1 a control voltage with which field-effect transistor T1 can be controlled between the full "on" condition and the full "off" condition. Control circuit C is also connected to ground; an operating voltage required for the control circuit, generally also the on-board power supply, is not shown.

The criteria according to which control circuit C operates do not form part of the present invention. This applies both to the question as to whether a quantity is actually being regulated or only being controlled here, and to what is used as the desired value of the quantity being controlled and what as the actual value. The desired value may be both a predetermined limit value, above or below which the quantity being controlled must not pass, and a manually preset value. The actual value may be a measured temperature value or the value of a voltage developed across the load.

Figure 2:
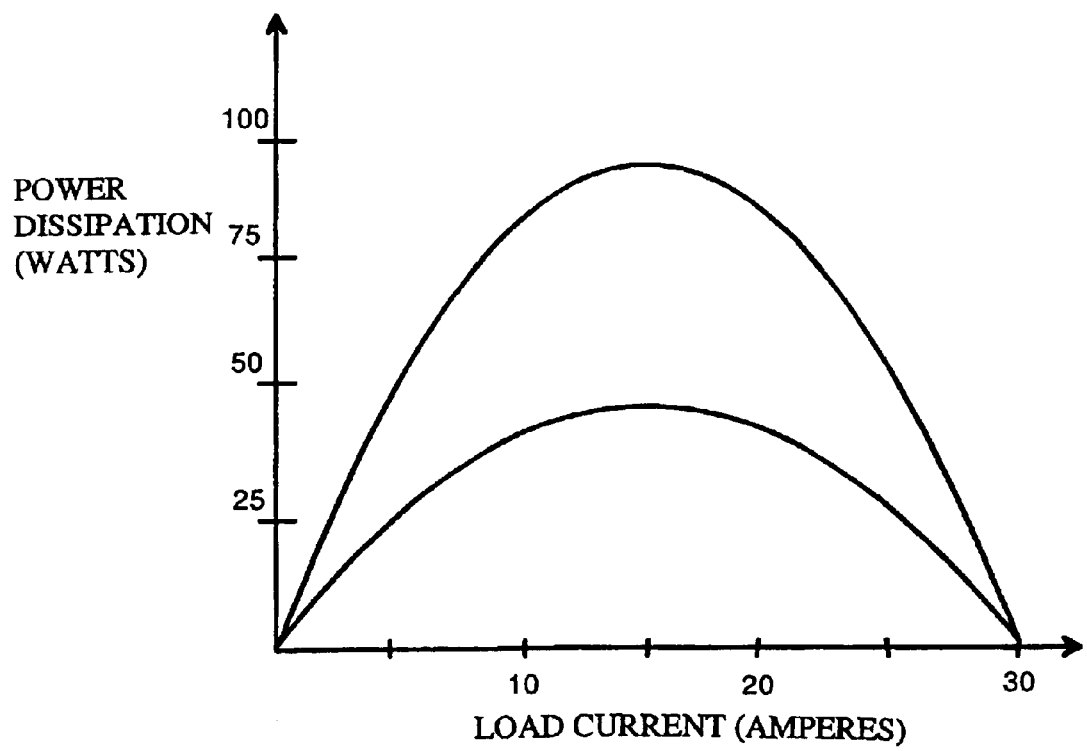
FIG. 2 is a diagram in which the power dissipation is plotted as a function of the load current for the example of FIG. 1.

FIG. 2 shows a diagram in which the power dissipation is plotted as a function of the load current for the example of FIG. 1. The load is assumed here to be a purely resistive load, even if it is a fan motor, for example. In the above-mentioned example with a current of 30 A at 12 V and a power of 360 W, a resistance of 0.4 ohms is thus present. The power dissipation in the control transistor is zero both when no current is flowing, and thus at the minimum of the load, and when the control transistor is fully on, so that (practically) no voltage drops across it, i.e., at the maximum of the load. Maximum power dissipation occurs when the applied voltage divides equally between control transistor T1 and load L. Then, half of the maximum current flows, whereby one quarter of the maximum power consumed by control transistor T1 is lost. The same amount, namely also one quarter of the maximum power, here 90 W, is absorbed by the load at this operating point. In between, a parabolic characteristic is obtained (upper curve).

Below this characteristic, a further curve shows the power dissipation in a transistor for the case where two identical transistors are connected in parallel and the power dissipation divides equally between the two. As a sum, however, the losses are the same as with only one transistor (upper curve).

As long as the power in load L is not turned on and off under clock-pulse control, but the current (or the voltage) is reduced linearly, the circuit arrangement that performs this will in any case have the same loss curve as the upper curve in FIG. 2. In a circuit arrangement according to the invention as is shown by way of example in FIG. 3, however, a large part of the power is dissipated not in a transistor, but in a resistor. Resistors are not only less expensive than transistors that have to carry the same load, but they are also suitable for use at much higher temperatures. In addition, if the load is a heater, the heat dissipated in a resistor can more easily be used as part of the effective power.

Figure 3:
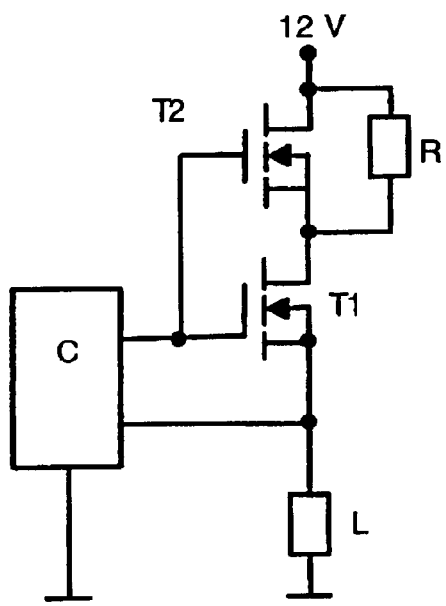
FIG. 3 shows a load and a circuit arrangement in accordance with the invention.

In the example of FIG. 3, a further field-effect transistor T2 is connected in series with field-effect transistor T1 between the terminals "12 V" and ground of the on-board power supply. Furthermore, the control terminals of the two field-effect transistors are connected in parallel.

Connected in parallel with the further field-effect transistor T2 is a resistor R. The value of the parallel-connected resistor R is assumed to be equal to the resistance value of load L, both being invariable and particularly the load L being not changed by switching actions.

Figure 4:
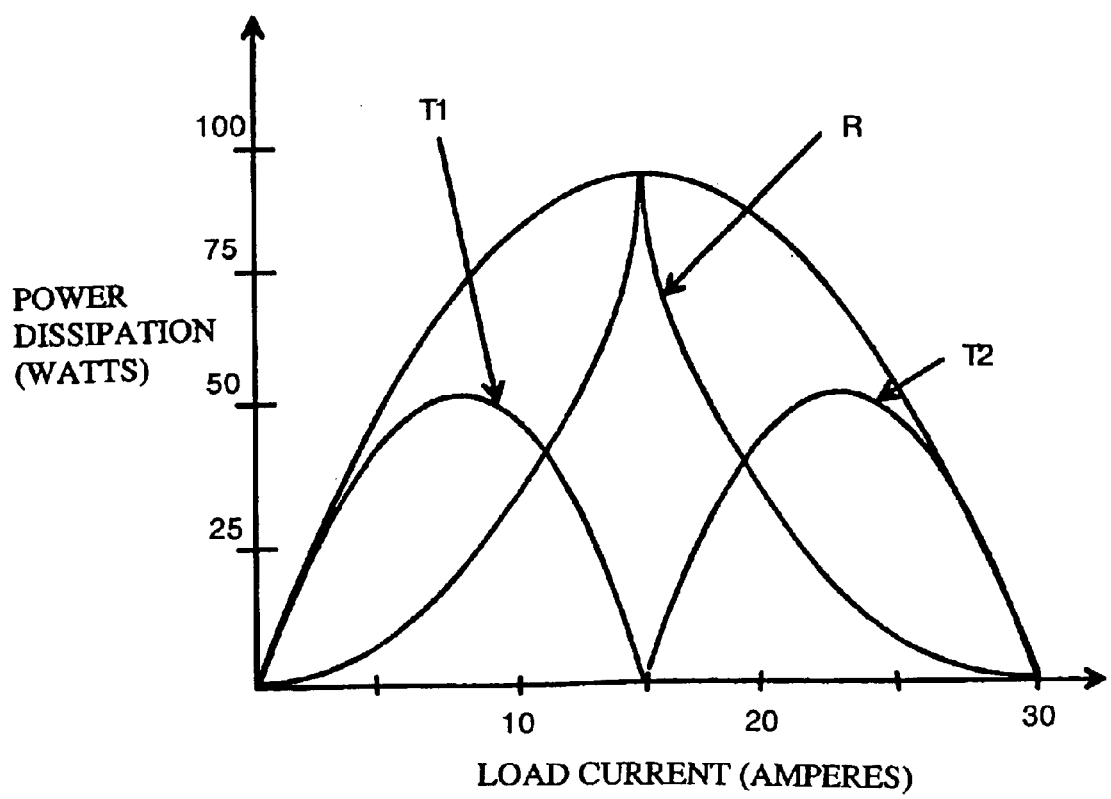
FIG. 4 is a diagram corresponding to that of FIG. 2 for the circuit arrangement of FIG. 3.

If the normally off N-channel types shown here are used, particularly simple control is achieved, so that the mode of operation shown in FIG. 4 is obtained in a simple manner:

When the control voltage is zero, both transistors are off. No current is flowing. As the control voltage increases, transistor T1 is caused to conduct more and more heavily; transistor T2 remains off, and the current then flows through resistor R. As in the case of FIG. 2, the power dissipation in transistor T1 increases to a maximum value and then falls back to zero until transistor T1 is fully on.

In this stage, the total voltage is divided between resistor R and load L, and no current is flowing through transistor T2. On the above assumption that the value of the parallel-connected resistor R is equal to the resistance value of load L, which assumption is also the basis of FIG. 4, the maximum power dissipation occurs at this operating point, namely exclusively in resistor R. No power is dissipated in transistors T1 and T2.

As the control voltage continues to rise, transistor T2 begins to conduct until finally both transistors are fully on, with the power dissipation in resistor R decreasing from the maximum value to zero, while the power dissipation in transistor T2 first increases and then drops to zero again. At the end, both transistors are on, and load L is connected to the full voltage, draws the maximum current of 30 A, and thus absorbs the maximum power of 360 W.

In this simple case, a loss occurs only in one of the two transistors at a time, namely a maximum of half the maximum loss, in this example 45 W. Thus, only this loss at the most has to be dissipated via heat sinks. It will therefore suffice if the two transistors have a common heat sink which has this heat dissipation capability. Since resistor R may become hotter, the cooling can be simpler than for a comparable heat removal from transistors.

If, for whatever reason, the two resistance values cannot always be equal, the aforementioned advantages will be lost to the extent of the inequality. A residual advantage will remain, however.

If, for particular reasons or for particular applications, other types of field-effect transistors should prove to be better suited, their control may have to be changed; under certain circumstances, separate control of the two transistors may be necessary. In any case, however, an improvement over the circuit arrangement of FIG. 1 will remain.

What is claimed is:

1. A circuit arrangement for controlling the electric power to be supplied from a direct-current source to a load, particularly to a fan or heater in a motor vehicle, the circuit arrangement comprising a field-effect transistor to be connected in series with the load to be controlled and a control circuit for controlling the field-effect transistor, the field-effect transistor having a second field-effect transistor connected in series therewith, a resistor being connected in parallel with one of the field-effect transistors, and the control circuit being adapted to control the two field-effect transistors in the sense of a fadeover between two final states in each of which one of the field-effect transistors is off and the other is on.

2. A circuit arrangement as set forth in claim 1, wherein the resistance value of the resistor connected in parallel with said one of the two field-effect transistors is equal to the resistance value of the load.

3. A circuit arrangement as set forth in claim 1, wherein the two field-effect transistors are of the same kind, and wherein their control inputs are connected in parallel.

* * * * *